UNITED STATES PATENT OFFICE.

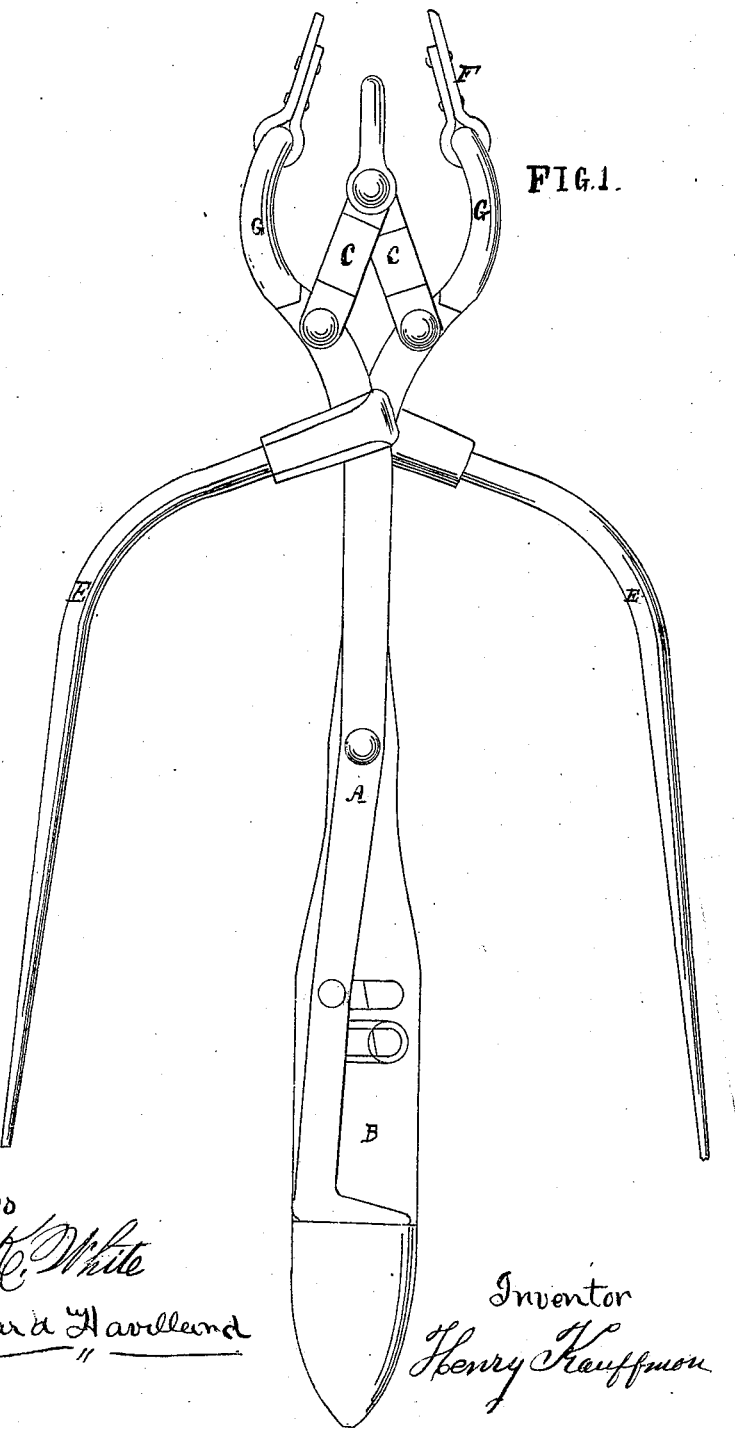

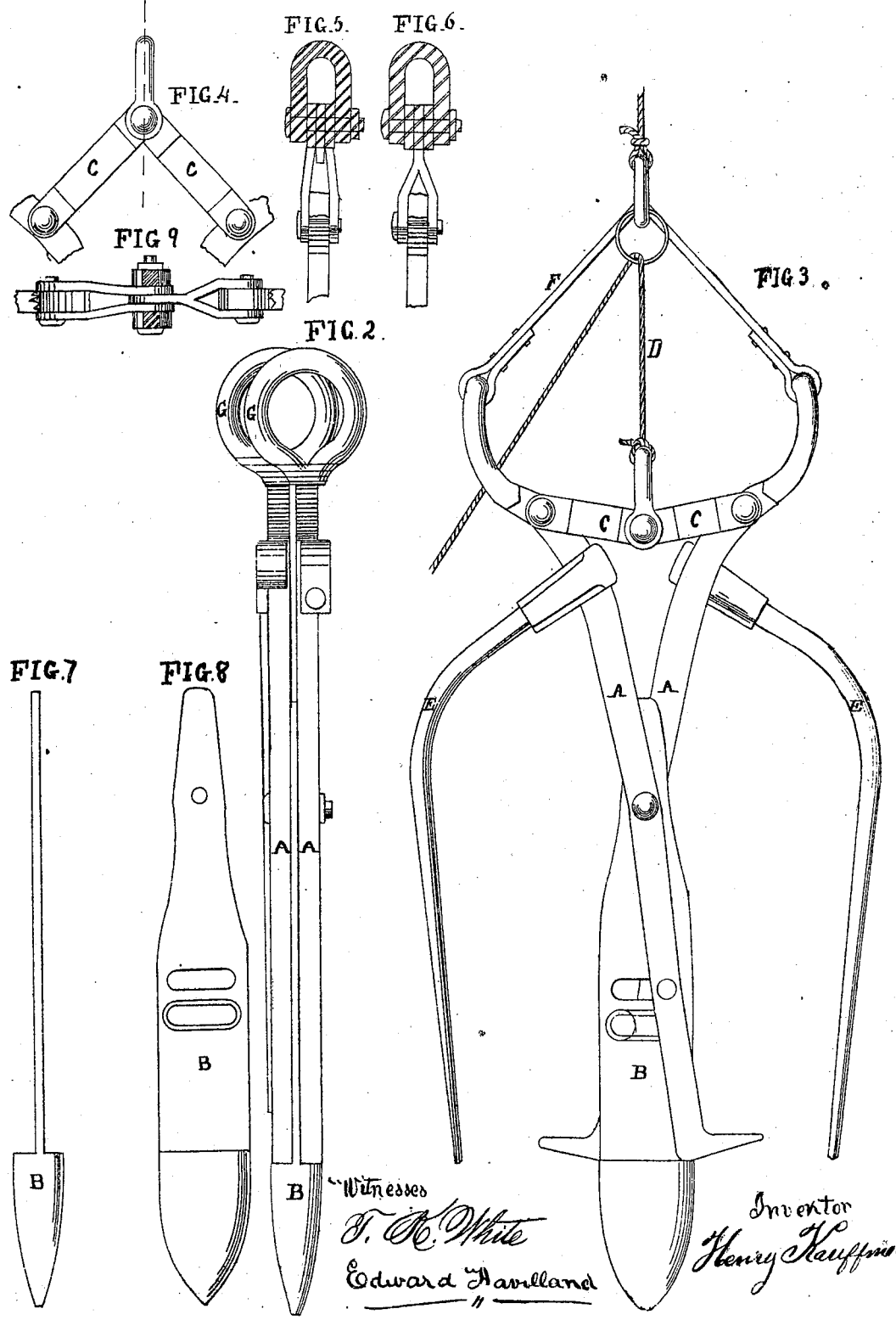

HENRY KAUFFMAN, OF YORK COUNTY, PENNSYLVANIA.

IMPROVEMENT IN HORSE HAY-FORKS.

Specification forming part of Letters Patent No. 59,033, dated October 23, 1866.

*To all whom it may concern:*

Be it known that I, HENRY KAUFFMAN, of the county of York and State of Pennsylvania, have invented a new and useful Implement for the Purpose of Unloading Hay, which I designate as the "Keystone Hay-Lifter;" and I do hereby declare that the following is a full, clear, and exact description of the construction and operation of the same, reference being had to the annexed drawings, making a part of this specification, in which—

Figure 1 is a front view of the machine closed, ready for use; Fig. 2, a side view of the same; Fig. 3, a view of the implement open in the hay; Figs. 4, 5, 6, and 9, details of the coupling; Fig. 7, a side view of the spear-head and guard which prevents the hay from clogging the hooks; Fig. 8, a front view of the spear-head.

This implement consists of two wrought-iron legs, A A, with hooks at the extremities working on a pivot, but separated from each other by a flat piece of wrought-iron terminating in a spear-head, as shown in Fig. 2, (marked on the plans B.) These legs are joined together at the top by a coupling, C, Figs. 4, 5, 6, and 9, which is so arranged as to keep the machine open in the hay, and are closed by means of a check-rope, D, when it is desired to withdraw the lifter out of the hay.

A removable prong, E, is attached to each leg for the purpose of retaining the hay on the hooks.

By means of the leather strap F, fastened to the handles G G, the lifter is suspended to a hoisting-machine.

What I claim as my invention, and desire to secure by Letters Patent, is—

1. The dividing-iron B, which prevents the hay from clogging and stopping the operation of the hooks in their lateral movement, and is provided with the spear-head, which facilitates penetration into the hay.

2. The combination of the hooks A A and the removable prongs E E, arranged for joint operation in the manner and for the purpose set forth.

HENRY KAUFFMAN.

Witnesses:
T. K. WHITE,
EDWARD HAVILLAND.